(12) United States Patent
Li

(10) Patent No.: US 8,388,305 B2
(45) Date of Patent: Mar. 5, 2013

(54) FAN ASSEMBLY WITH VIBRATION ABSORBING MEMBER

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 599 days.

(21) Appl. No.: 12/695,699

(22) Filed: Jan. 28, 2010

(65) Prior Publication Data

US 2011/0091313 A1 Apr. 21, 2011

(30) Foreign Application Priority Data

Oct. 16, 2009 (CN) .......................... 2009 2 0312610

(51) Int. Cl.
*F04D 29/60* (2006.01)
*F04D 29/66* (2006.01)

(52) U.S. Cl. .................. 415/119; 415/213.1; 415/214.1

(58) Field of Classification Search .................. 415/119, 415/213.1, 214.1
See application file for complete search history.

(56) References Cited

U.S. PATENT DOCUMENTS

| 5,316,423 A * | 5/1994 | Kin ................................ 411/510 |
| 2007/0019382 A1* | 1/2007 | Gundlach ...................... 361/695 |
| 2008/0232062 A1* | 9/2008 | Lee ................................ 361/687 |
| 2008/0259562 A1* | 10/2008 | Chen .............................. 361/690 |
| 2008/0285225 A1* | 11/2008 | DeMoss et al. ............... 361/685 |
| 2010/0025017 A1* | 2/2010 | Zhang et al. ............. 165/104.31 |

* cited by examiner

Primary Examiner — Igor Kershteyn
(74) Attorney, Agent, or Firm — Altis Law Group, Inc.

(57) ABSTRACT

A fan assembly includes a chassis and a fan bracket secured in the chassis. The chassis has a bottom wall. The fan bracket includes a first sidewall and a second sidewall perpendicular to the bottom wall, and it is configured for securing the fans. A securing flange extends from an edge of the first sidewall, and is secured to the bottom wall of the chassis. A plurality of securing slots is defined in the securing flange. A plurality of first members engages in the securing slots and isolates the bottom wall of the chassis from the securing flange.

16 Claims, 6 Drawing Sheets

FAN ASSEMBLY WITH VIBRATION ABSORBING MEMBER

BACKGROUND

1. Technical Field

The present disclosure relates to fan assemblies with vibration absorbing members.

2. Description of Related Art

Heat dissipating devices perform the critical function of removing heat from a computer system. The heat dissipating device often includes one or more fans received in a bracket. For example, in a server system, a plurality of fans is provided to efficiently dissipate heat. The fans are secured to a bracket, and the bracket is mounted in a server enclosure. When the server system is running, vibration generated by the disk drive or other devices secured in the server system is transferred to the server enclosure and the bracket. The fans can be adversely affected by the vibration, such that heat dissipation efficiency is impaired.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
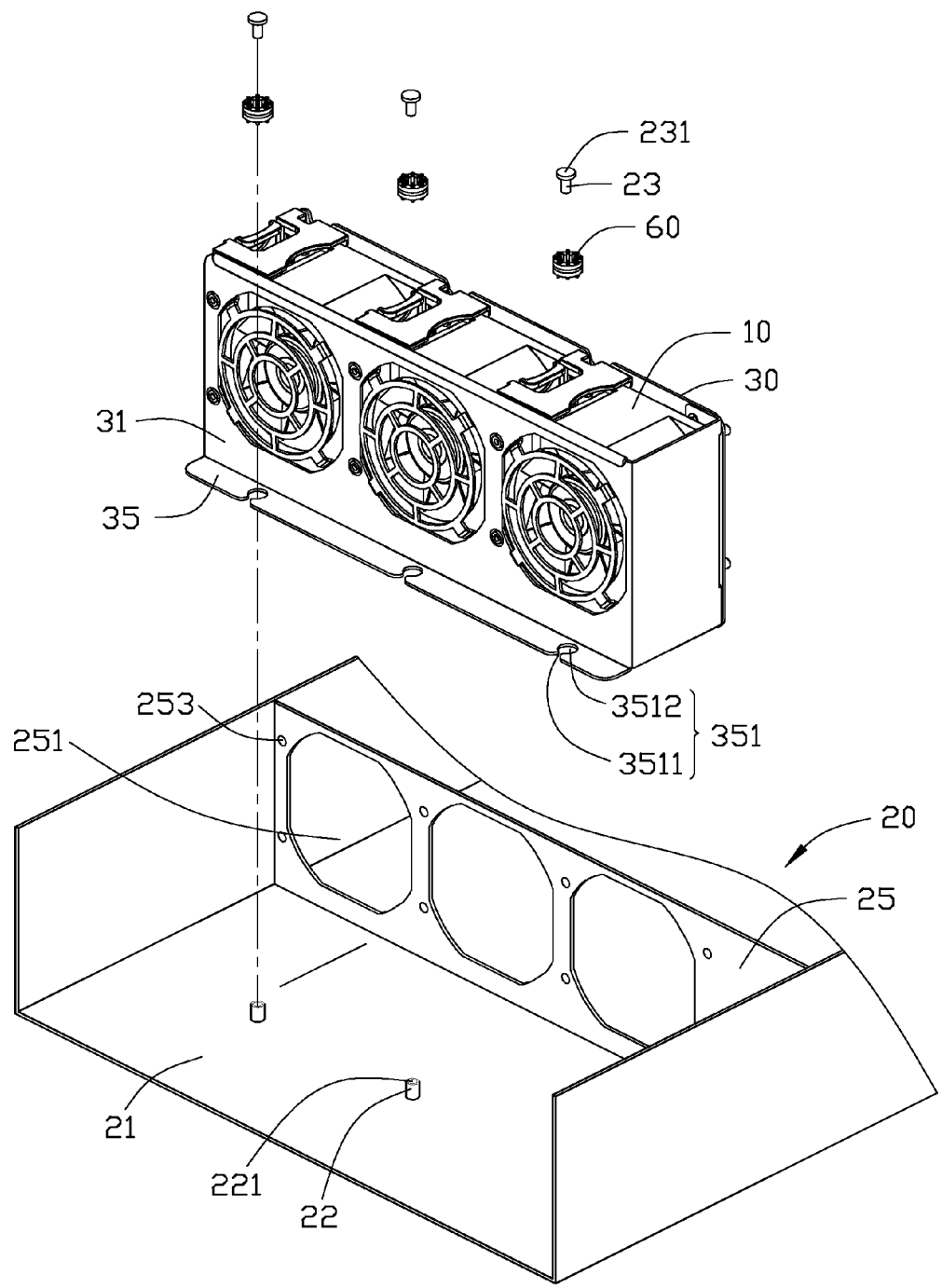
FIG. 1 is an exploded, isometric view of a fan assembly in accordance with an embodiment.
Figure 2:
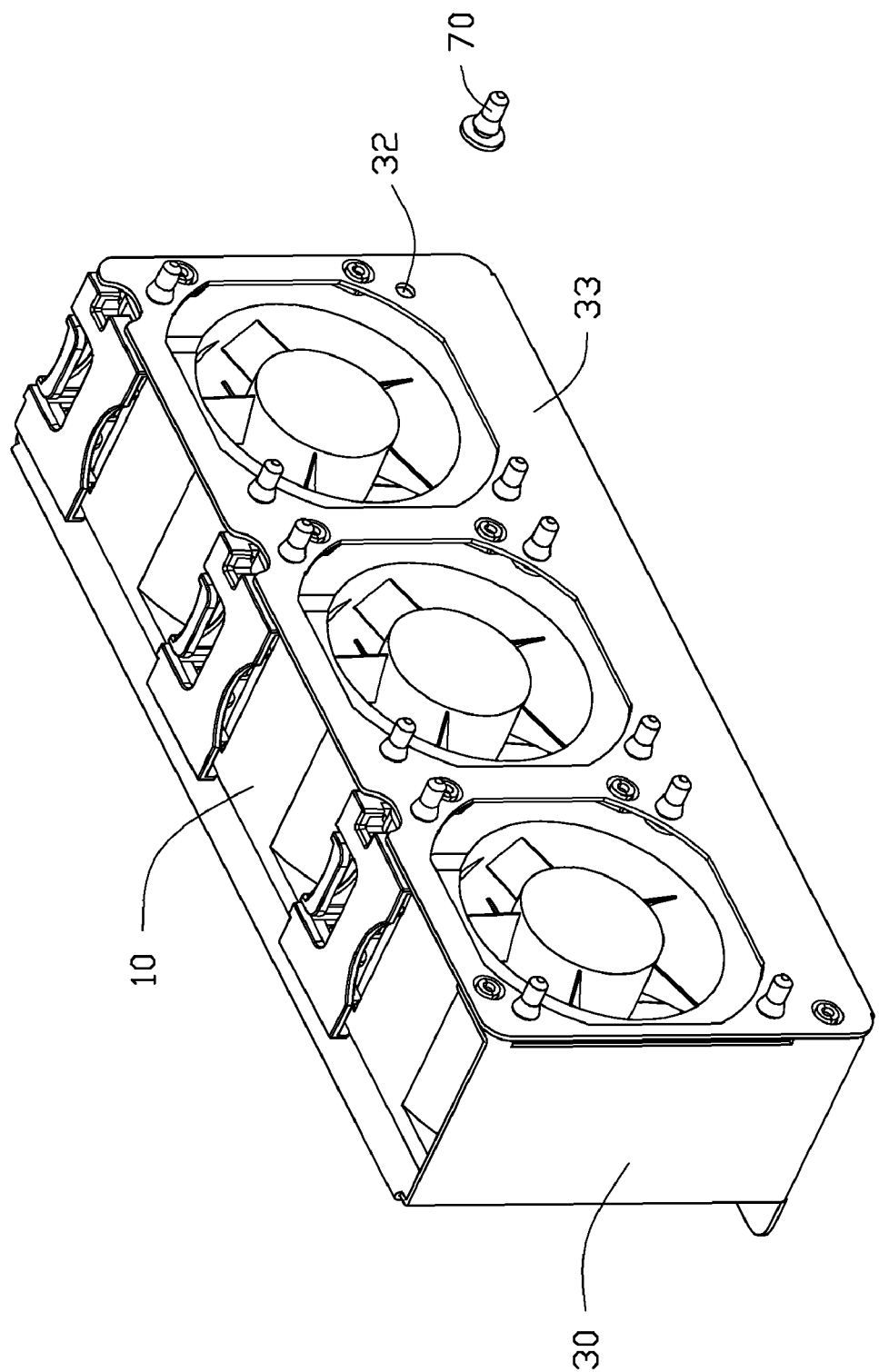
FIG. 2 is an isometric view of a fan bracket with fans of FIG. 1.

Referring to FIGS. 1 and 2, a fan assembly includes a chassis 20, a fan bracket 30, a plurality of fans 10 accommodated in the fan bracket 30, a plurality of first members 60, and a plurality of second members 70 configured to absorb vibration. In one embodiment, the members 60, 70 are made of resilient materials.

The chassis 20 includes a bottom wall 21. A mounting bracket 25 is disposed in the chassis 20, and perpendicular to the bottom wall 21. A plurality of posts 22 extends from the bottom wall 21. Each post 22 defines a post hole 221, which is configured to couple with a fastener 25. The mounting bracket 25 defines a plurality of heat dissipating holes 251 corresponding to the fans 10. A plurality of mounting bracket holes 253 are defined in the mounting wall 25 around each heat dissipating hole 251.

The fan bracket 30 includes a first sidewall 31 and a second sidewall 33 opposite to the first sidewall 31. A securing flange 35 perpendicularly extends from a bottom edge of the first sidewall 31. A plurality of securing slots 351 is defined in the securing flange 35. Each securing slots 351 includes an entrance 3511 and a round accommodating portion 3512. The entrance 3511 is narrower than the round accommodating portion 3512. A plurality of second sidewall holes 32 is defined in the second sidewall 33, configured for the second members 70 engaging therein.

Figure 3:
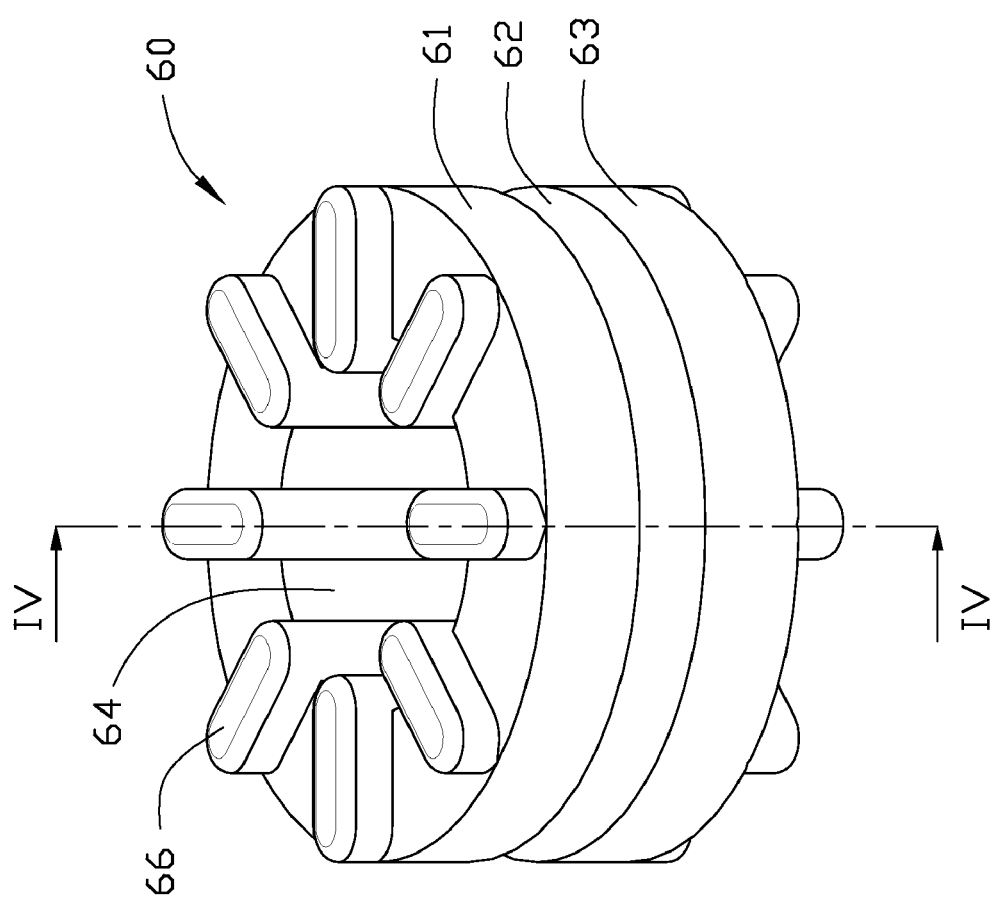
FIG. 3 is an exploded, isometric view of a first vibration absorbing member of FIG. 1.
Figure 4:
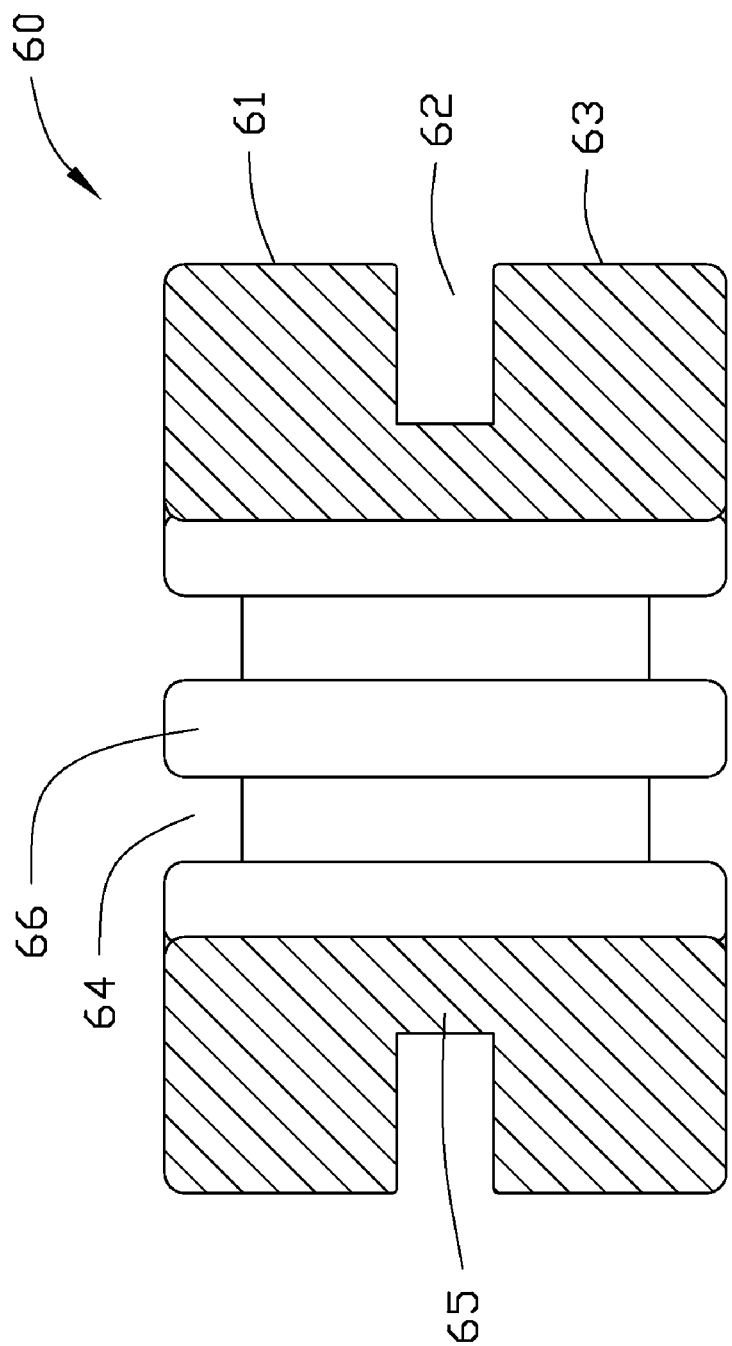
FIG. 4 is a cross-section view of the first vibration absorbing member of FIG. 3.

Referring to FIGS. 3 and 4, each first member 60 includes a first isolating wall 61, a second isolating wall 63, and a connecting portion 65 connecting the first isolating wall 61 to the second isolating wall 63. An annular first receiving slot 62 is defined between the first wall 61 and the second wall 63. A securing hole 64 is defined through the first wall 61 and the second wall 63. A plurality of protrusions 65 protrudes from outer surfaces of the first wall 61 and the second wall 63, and extends through the securing hole 64 along an axial direction.

Figure 5:
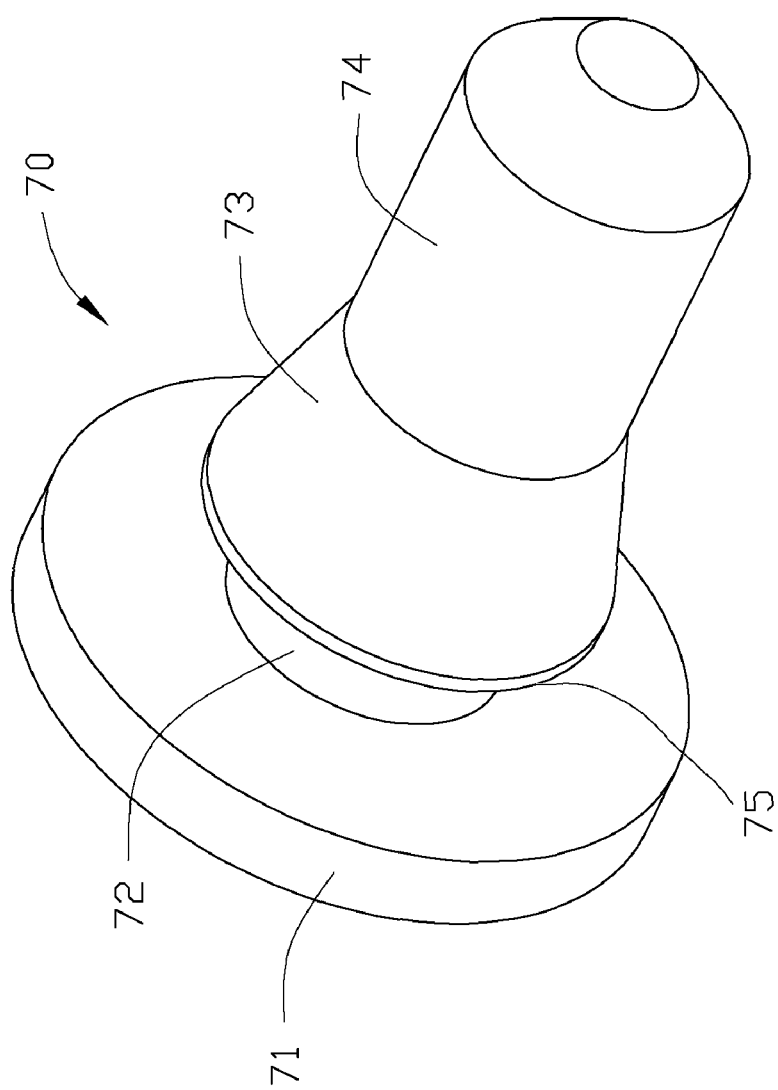
FIG. 5 is an exploded, isometric view of a second vibration absorbing member of FIG. 1.

Referring to FIG. 5, each second member 70 includes a round head 71 and a cylindrical shaft 74 extending from a bottom of the head 71. A blocking portion 73 protrudes from the shaft 74. The blocking portion 73 includes a tapered outer surface 73 and a flat surface 75 opposite to the head 71. An annular second receiving slot 72 is defined between the head 71 and the blocking portion 73. The head 71, the shaft 74, and the blocking portion 73 have a common center. The maximum diameter of the blocking portion 73 is greater than diameters of the second sidewall holes 32 in the fan bracket 30, and the minimum diameter of the blocking portion 73 is smaller than the diameters of the second sidewall holes 32.

Figure 6:
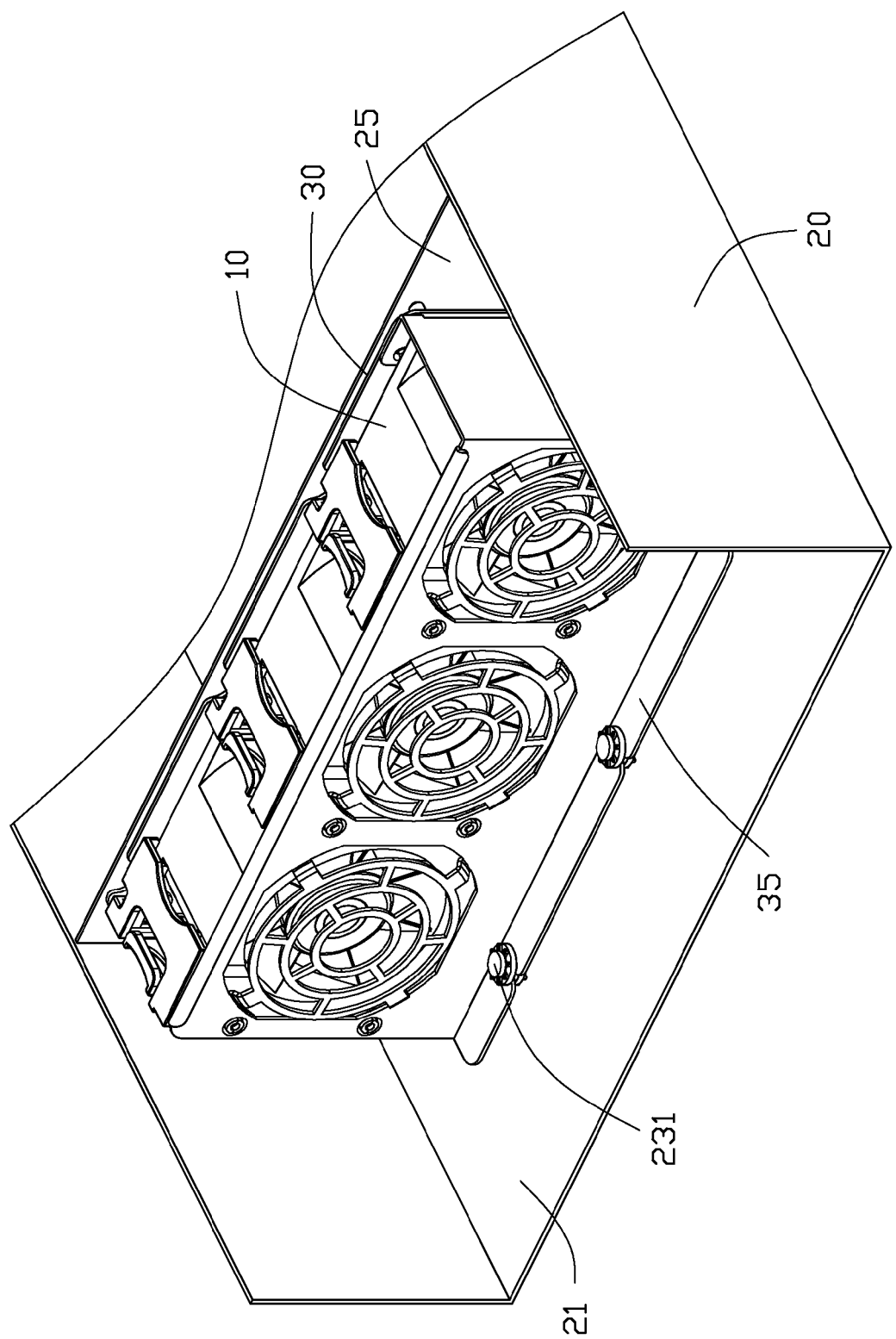
FIG. 6 is an assembled view of the fan assembly of FIG. 1.

Referring to FIG. 6, in assembly, the first members 60 engage in the securing slots 351 of the securing flange 35 via the entrance 3511. The connecting portions 65 of the first members 60 are accommodated in corresponding accommodating portions 3512 of the securing slots 351 in the securing flange 35. A peripheral area of the securing flange 35 adjacent to the securing slots 351 is sandwiched by the first wall 61 and the second wall 63.

The fan bracket 30 with the fans 10 is disposed on the bottom wall 21 of the chassis 20. The posts 21 extend through the securing holes 64 of the first members 60. The protrusions 65 on the second isolating wall 63 abut on the bottom wall 21 to isolating the securing flange 35 from the bottom wall 21. The fasteners 23 extend through the securing holes 64 of the first members 60 to engage with the post holes 221. The second wall 61 of each first member 60 is disposed between a fastener head 231 of each fastener 23 and the securing flange 35. The fastener head 231 abuts against the protrusions 65 on the first isolating wall 61. Thus, the fan bracket 30, the fasteners 23, and the chassis 10 are connected together and isolated from each other respectively, thereby preventing vibration caused by the chassis from transmitting to the fan bracket 30 when the chassis 10 is struck.

The second sidewall 33 abuts the mounting bracket 25. The second sidewall holes 32 of the fan bracket 30 are aligned with the mounting bracket holes 253. The shafts 74 of the second vibration absorbing members 70 extend through the second sidewall holes 32 and the mounting bracket holes 253. The blocking portions 73 are resiliently deformed and inserted through the second sidewall holes 32 and the mounting bracket holes 253 to engage with the mounting bracket 25. Thus, the fan bracket 30 is secured to the chassis 20. The peripheral areas of the second sidewall 33 adjacent to the second sidewall holes 32 are respectively sandwiched between the corresponding heads 71 and the blocking portions 73 of the second members 70. When the fans 10 are received in the fan bracket 30, the heads 71 of the second members 70 are disposed between the second sidewall 33 of the fan bracket 30 and the fans 10 to absorb vibration caused by the fan bracket 30.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A fan assembly, comprising:
   a chassis having a bottom wall;
   a fan bracket comprising a first sidewall and a second sidewall, the first sidewall and the second sidewall perpendicular to the bottom wall and configured for securing fans therebetween, a securing flange extending from an edge of the first sidewall and secured to the bottom wall of the chassis, a plurality of securing slots defined in the securing flange; and
   a plurality of first members engaged in the securing slots and isolating the bottom wall of the chassis from the securing flange, each first member comprising a first wall and a second wall, the first member defining a securing hole through the first wall and the second wall, and a fastener extending through the securing hole to secure the securing flange of the fan bracket to the bottom wall of the chassis, the second wall located between a head of the fastener and the securing flange.

2. The fan assembly of claim 1, wherein a connecting portion connects the first wall to the second wall; the connecting portion is accommodated in the corresponding securing slot in the securing flange .

3. The fan assembly of claim 2, wherein the first wall is located between the bottom wall and the securing flange.

4. The fan assembly of claim 1, wherein a plurality of protrusions is formed on the first wall and the second wall, the protrusions on the first wall abuts the bottom wall of the chassis, and the head of the fastener abuts the protrusions on the second wall.

5. The fan assembly of claim 1 further comprising a plurality of second members engaged with the second sidewall of the fan bracket, and isolating the second sidewall from the fans.

6. The fan assembly of claim 5, wherein each second member comprises a head and a blocking portion connected to the head; the head is located between the second sidewall of the fan bracket and the corresponding fan, and the second sidewall is sandwiched by the head and the blocking portion.

7. The fan assembly of claim 6, wherein the blocking portion comprises a tapered outer surface and a flat surface opposite to the head, the tapered outer surface is configured to allow the blocking portion to extend through a securing hole in the second sidewall and sandwich the second sidewall of the fan bracket between the head of the second member and the flat surface of the blocking portion.

8. A fan assembly, comprising:
   a chassis having a bottom wall;
   a fan bracket adapted to accommodate fans;
   a plurality of first members secured to the fan bracket and arranged to isolate the bottom wall of the chassis from the fan bracket; and
   a plurality of resilient second members engaged with the fan bracket the second members disposed between the fans and the fan bracket, a buffering distance kept between the fans and the fan bracket thereby.

9. The fan assembly of claim 8, wherein the fan bracket comprises a first sidewall and a second sidewall parallel to each other, a securing flange extends from the first sidewall; the first members engage with the securing flange, and the second members engage with the second sidewall of the fan bracket.

10. The fan assembly of claim 9, wherein a plurality of securing slots is defined in the securing flange; each first member comprises a first wall and a second wall, a connecting portion connects the first wall to the second wall; and the connecting portion is accommodated in the corresponding securing slot in the securing flange and the connecting portion is accommodated in the corresponding securing slot in the securing flange.

11. The fan assembly of claim 10, wherein the first wall is located between the bottom wall and the securing flange.

12. The fan assembly of claim 10, wherein the member defines a securing hole through the first wall and the second wall, and a fastener extends through the securing hole to secure the securing flange of the fan bracket to the bottom wall of the chassis.

13. The fan assembly of claim 12, wherein the second wall is located between a head of the fastener and the securing flange.

14. The fan assembly of claim 12, wherein a plurality of protrusions is formed on the first wall and the second wall, the protrusions on the first wall abuts the bottom wall of the chassis, and the head of the fastener abuts the protrusions on the second wall.

15. The fan assembly of claim 8, wherein each second member comprises a head and a blocking portion connected to the head, the head is disposed between the second sidewall of the fan bracket and the corresponding fan for keeping the buffering distance, and the second sidewall is sandwiched by the head and the blocking portion of the second member.

16. The fan assembly of claim 15, wherein the blocking portion comprises a tapered outer surface and a flat surface opposite to the head, the tapered outer surface is configured to allow the blocking portion to extend through a securing hole in the second sidewall and sandwich the second sidewall of the fan bracket between the head of the second member and the flat surface of the blocking portion.

* * * * *